(12) United States Patent
Miyashita et al.

(10) Patent No.: US 11,852,296 B2
(45) Date of Patent: Dec. 26, 2023

(54) OIL APPLICATION DEVICE

(71) Applicant: HONDA MOTOR CO., LTD., Tokyo (JP)

(72) Inventors: Keita Miyashita, Tokyo (JP); Kazuaki Ushiku, Tokyo (JP); Kenji Kitamura, Tokyo (JP); Xuan Kan, Tokyo (JP); Takao Inoue, Tokyo (JP); Hideaki Onda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 304 days.

(21) Appl. No.: 17/498,790

(22) Filed: Oct. 12, 2021

(65) Prior Publication Data

US 2022/0120381 A1 Apr. 21, 2022

(30) Foreign Application Priority Data

Oct. 16, 2020 (JP) ................. 2020-174654

(51) Int. Cl.
*F16N 7/14* (2006.01)
*F16N 7/04* (2006.01)

(52) U.S. Cl.
CPC ................. *F16N 7/04* (2013.01); *F16N 7/14* (2013.01); *F16N 2210/34* (2013.01)

(58) Field of Classification Search
CPC ..... F16N 7/14; F16N 7/04; F16N 7/12; F16N 2210/34; F16N 7/16; H02K 15/10; H02K 15/105; H02K 15/095; B05C 1/06; B05C 1/16; B05C 13/02

USPC ............................................. 184/14
See application file for complete search history.

(56) References Cited

U.S. PATENT DOCUMENTS

2014/0013592 A1 * 1/2014 Yoshida ............... H02K 15/064
29/732
2023/0296038 A1 * 9/2023 Wang ..................... B60K 11/02
184/14

FOREIGN PATENT DOCUMENTS

JP 4300836 7/2009
JP 5841017 1/2016

* cited by examiner

*Primary Examiner* — Michael R Mansen
*Assistant Examiner* — Mark K Buse
(74) *Attorney, Agent, or Firm* — AMIN, TUROCY & WATSON, LLP

(57) ABSTRACT

An oil application device includes an oil supply member capable of selectively supplying oil to a first lateral surface and a second lateral surface of a flat wire. The oil supply member includes a first side surface and a second side surface. A part of the first side surface is a first application surface that is in contact with a part of the first lateral surface. Another part of the first side surface is a first non-application surface spaced apart from the first lateral surface. A part of the second side surface is a second application surface that is in contact with a part of the second lateral surface. Another part of the second side surface is a second non-application surface spaced apart from the second lateral surface.

8 Claims, 14 Drawing Sheets

OIL APPLICATION DEVICE

CROSS-REFERENCE TO RELATED APPLICATION

This application is based upon and claims the benefit of priority from Japanese Patent Application No. 2020-174654 filed on Oct. 16, 2020, the contents of which are incorporated herein by reference.

BACKGROUND OF THE INVENTION

Field of the Invention

The present invention relates to an oil application device for selectively applying oil to a predetermined surface of a flat wire.

Description of the Related Art

A stator constitutes a rotating electric machine such as a motor or a generator. The stator includes a stator core and an electromagnetic coil. The stator core has a plurality of teeth portions. A slot is formed between adjacent tooth portions. The electromagnetic coil is placed in the slot. The electromagnetic coil is formed, for example, by winding a conductive wire around the tooth portion. Also, the electromagnetic coil is configured as described in JP 5841017 B2. In this case, the electromagnetic coil is formed of an electrical conductor (hereinafter also referred to as a "segment"). The segment has two legs and a folded part to have a substantially U-shape.

When a conductive wire is used, an insulator is interposed between the stator core and the conductive wire. Here, a film is formed on the conductive wire. If the frictional resistance between the insulator and the conductive wire increases, there is a concern that the film or the insulator may be damaged. In order to avoid the concern, oil is applied to the conductive wire before being wound around the tooth portion. The oil serves as a lubricant. In particular, FIG. 3 of JP 4300836 B2 discloses an oil application device for applying oil to a conductive wire.

In the configurations that use segments, oil may be applied to the segments. The oil is applied in order that the frictional resistance between the insulating paper previously placed in the slot (see FIG. 7 of JP 5841017 B2) and the legs inserted into the slot may be reduced. In this case, the film or insulating paper (insulator) of the legs is prevented from being damaged when the segment is twisted and bent as described later.

The distal ends of the legs are exposed from the slots. The exposed distal ends are joined to the distal ends of other legs exposed from another slot. Thus, the segments are electrically connected to each other. The folded part exposed from the slot is twisted and bent. Thus, an electromagnetic coil including segments is obtained.

SUMMARY OF THE INVENTION

The segment is produced by bending a rectangular wire (flat wire) extending in a linear shape into a substantially U-shape. A case where oil is applied to a linear object is compared with a case where oil is applied to a U-shaped object. In the latter case, it is necessary to move an application means such as a roller or a brush relatively while changing the advancing direction of the application means along the U-shape. On the other hand, in the former case, there is no need to do so. Therefore, in the former case oil can be applied more easily. Thus, for example, as described in JP 4300836 B2, it is considered to pass a part of the flat wire through the oil while pulling out the flat wire. In this manner, the oil is applied to the flat wire.

In this case, the oil is evenly applied to the entire surface of the flat wire. When several flat wires in this state are bundled and a bending process thereof is performed to form them into a U-shape, the flat wires may slip with respect to a die such as a punch. In such a situation, they are bent (shaped or formed) insufficiently. That is, the yield of the segments is not sufficient.

Further, when the conductive wire is pulled out, the conductive wire often vibrates due to a change in tension applied to the conductive wire. In the configuration described in JP 4300836 B2, it is not easy to apply oil to the conductive wire in such a situation. That is, the oil is not stably applied to the conductive wire.

A principal object of the present invention is to provide an oil application device that is capable of applying oil to a flat wire so as to form the flat wire accurately.

Another object of the present invention is to provide an oil application device that is capable of applying oil to a flat wire so as to reduce frictional resistance between the flat wire and an insulator.

According to an embodiment of the present invention, there is provided an oil application device that selectively applies oil to a first lateral surface and a second lateral surface of a flat wire, the flat wire including a lower surface, an upper surface that is an opposite surface of the lower surface, the first lateral surface extending from the lower surface to the upper surface, and the second lateral surface that is an opposite surface of the first lateral surface and extends from the lower surface to the upper surface, the oil application device including:

an oil supply member including a first side surface and a second side surface facing the first lateral surface and the second lateral surface, respectively, the first side surface and the second side surface being separated from each other by a distance larger than a distance between the first lateral surface and the second lateral surface; and a rotation mechanism configured to rotate the oil supply member, wherein at least a part of the first side surface is a first application surface that is in contact with a part of the first lateral surface and that is configured to supply oil to the first lateral surface, at least a part of the second side surface is a second application surface that is in contact with a part of the second lateral surface and that is configured to supply oil to the second lateral surface, and the rotation mechanism rotates the oil supply member to a direction in which the first application surface comes into contact with the first lateral surface and the second application surface comes into contact with the second lateral surface.

According to the present invention, oil is selectively supplied from the oil supply member to the predetermined surfaces of the flat wire. That is, a surface other than the predetermined surfaces is set as a non-application surface to which oil is not applied. The flat wire is formed with the non-application surface facing the forming surface of the forming die. This prevents the flat wire from slipping relative to the forming surface. Therefore, the flat wire is accurately formed. As a result, a formed article having good dimensional accuracy can be obtained.

Further, the first side surface that supplies oil to the first lateral surface of the flat wire and the second side surface that supplies oil to the second lateral surface are partially separated from each other by a distance larger than the separation distance between the first lateral surface and the second lateral surface. Therefore, even when the flat wire vibrates in the horizontal direction while being fed out, a state is maintained in which a part of the first lateral surface contacts a part of the first side surface and a part of the second lateral surface contacts a part of the second side surface. Therefore, oil is supplied from the oil supply member to the first lateral surface and the second lateral surface.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Figure 1:
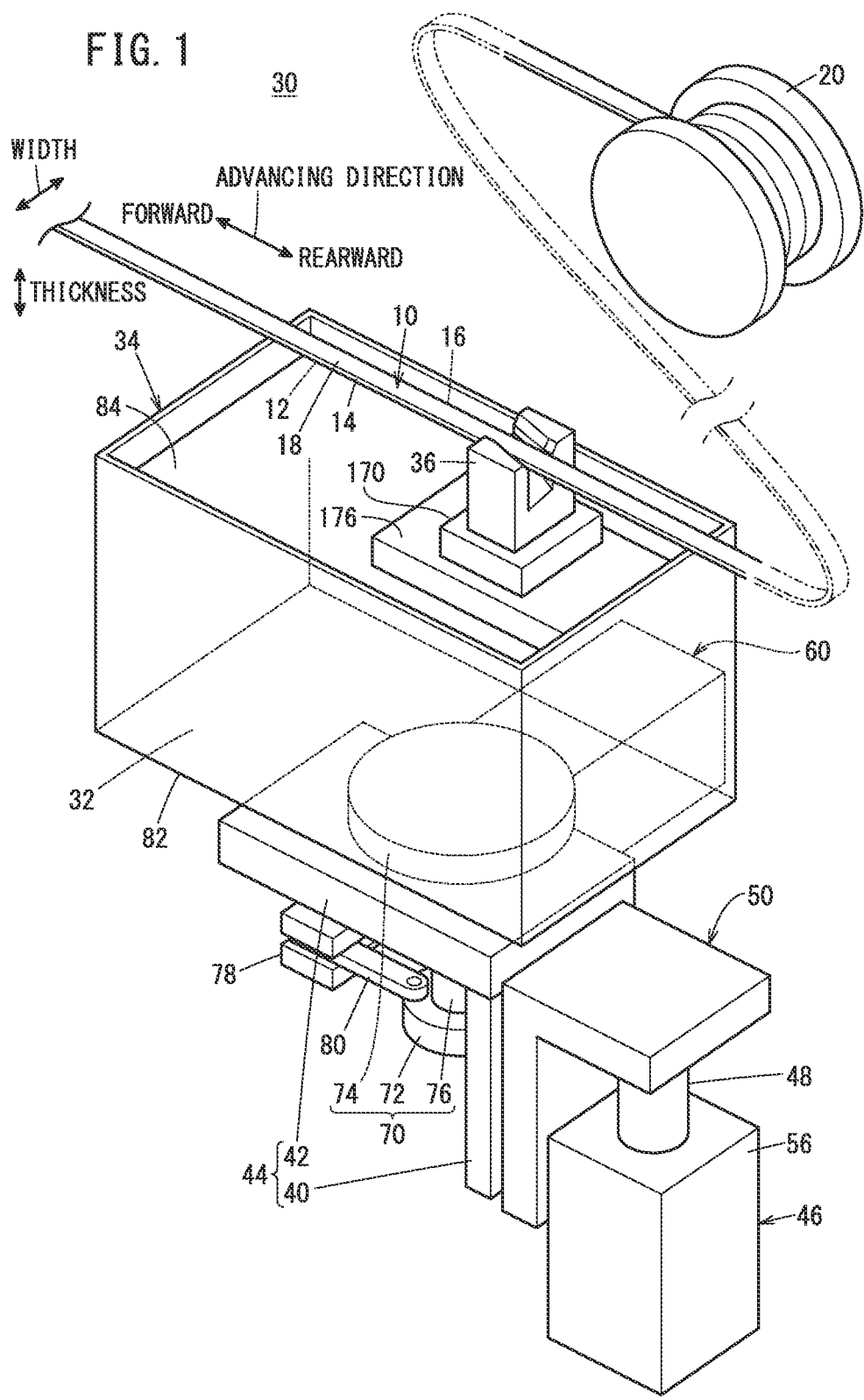
FIG. 1 is a schematic perspective view of a main part showing an oil application device and a flat wire according to an embodiment of the present invention.

Hereinafter, preferred embodiments of an oil application device according to the present invention will be presented and described in detail below with reference to the accompanying drawings.

First, with reference to FIGS. 1 and 2, a description will be given concerning a flat wire (rectangular wire) 10 schematically. The flat wire 10 has a lower surface 12, a first lateral surface 14, a second lateral surface 16, and an upper surface 18. The lower surface 12 faces vertically downward. The first lateral surface 14 and the second lateral surface 16 rise substantially perpendicularly from the lower surface 12. The upper surface 18 faces vertically upward. The lower surface 12 and the upper surface 18 are opposite to each other. Similarly, the first lateral surface 14 and the second lateral surface 16 are opposite to each other. Each intersection angle between the lower surface 12 and the first lateral surface 14 or the second lateral surface 16 is substantially 90°. Each intersection angle between the first lateral surface 14 or the second lateral surface 16 and the upper surface 18 is also substantially 90°. Therefore, as viewed from above, the flat wire 10 has a long rectangular shape and is a strip material.

Figure 3:
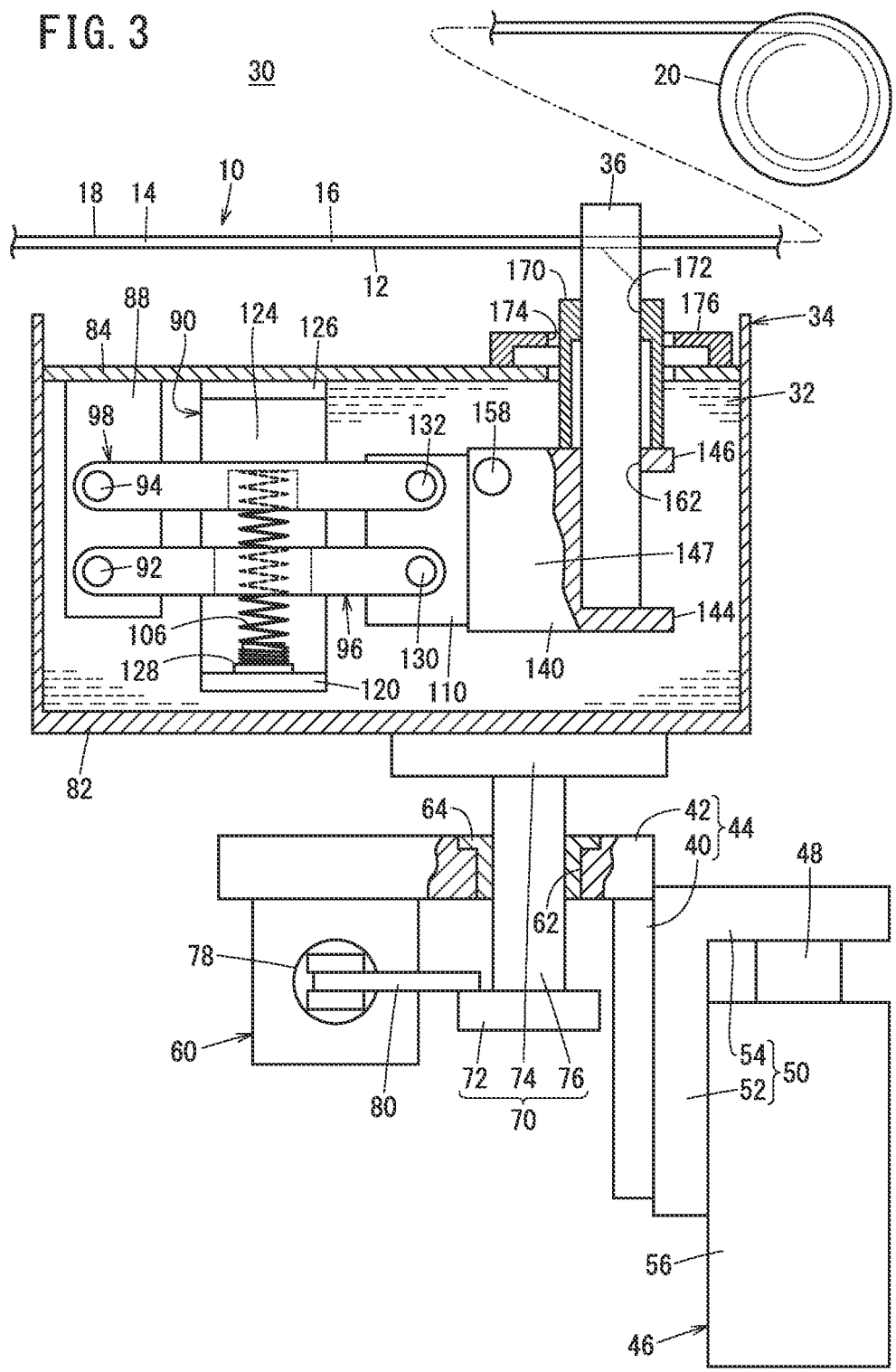
FIG. 3 is a side view, with partial cross section, of the oil application device according to the present embodiment.

One end of the flat wire 10 is wound around a bobbin 20 (see FIG. 3). The other end of the flat wire 10 is pulled out from the bobbin 20. Hereinafter, the pulled-out direction of the flat wire 10 (advancing direction of the flat wire 10) is also referred to as "extending direction of the flat wire 10". Unless otherwise specified, "front" in the following description refers to the downstream side in the advancing direction of the flat wire 10. "Rear" refers to the upstream side in the advancing direction of the flat wire 10. Therefore, one end of the flat wire 10 wound around the bobbin 20 is the rear end. The other end of the flat wire 10 pulled out from the bobbin 20 is a front end.

Further, the extending direction (vertical direction) of the first lateral surface 14 and the second lateral surface 16 is defined as a "thickness direction of the flat wire 10". On the other hand, the direction from the first lateral surface 14 toward the second lateral surface 16 or the opposite direction is the "width direction of the flat wire 10". The width direction is orthogonal to both the extending direction and the thickness direction of the flat wire 10. The thickness of the flat wire 10 is synonymous with the distance between the lower surface 12 and the upper surface 18. The width of the flat wire 10 is synonymous with the separation distance between the first lateral surface 14 and the second lateral surface 16.

Next, an oil application device 30 according to the present embodiment will be described in detail with reference to FIGS. 3 to 13. As understood from FIGS. 1 and 2, the oil application device 30 is a device for applying oil 32 to the flat wire 10.

FIG. 3 is a side view, with partial cross section, of the oil application device 30. FIG. 3 shows a side surface along the extending direction of the flat wire 10. The oil application device 30 includes an oil tank 34 storing the oil 32 and an oil supply member 36. A part of the oil supply member 36 is exposed from the oil tank 34.

A base (not shown) is disposed below the oil tank 34. A support base portion 44 is provided on the base. The support base portion 44 has a vertical wall 40 and a lateral wall 42. The vertical wall 40 rises upward. The lateral wall 42 is provided at an upper end of the vertical wall 40. The lateral wall 42 extends forward in the advancing direction of the flat wire 10. A first cylinder 46 is attached to the vertical wall 40. The first cylinder 46 is a lifting actuator and constitutes a lifting mechanism. A first rod 48 of the first cylinder 46 faces vertically upward. In this way, a posture in which the first rod 48 faces vertically upward is a standing posture.

The first cylinder 46 is a cylinder having a guide and includes a guide part 50 having a substantially L-shape in a side view. The guide part 50 has a guide body 52 and a rod connection board 54 substantially orthogonal to the guide body 52. The guide body 52 is attached to the vertical wall 40. An upper end of the first rod 48 is coupled to a lower surface of the rod connection board 54. A guide groove (not shown) is formed in a cylinder tube 56 of the first cylinder 46. The guide body 52 is provided with a guide rail (not shown). The guide rail is slidably engaged with the guide groove.

A second cylinder 60 in a lying posture is attached to the lower surface of the lateral wall 42. The second cylinder 60 is a rotary actuator and constitutes a rotation mechanism. A stepped hole 62 is formed in the lateral wall 42. The stepped hole 62 has a step portion formed by making an inner diameter difference. A bush 64 is positioned and fixed in the stepped hole 62. Specifically, a large-diameter flange portion is provided at the upper end of the bush 64. The flange portion is blocked by the step portion of the stepped hole 62. Thus, the bush 64 is prevented from falling out downward from the stepped hole 62.

A rotary table 70 is provided on the support base portion 44. The rotary table 70 includes a small disk portion 72, a large disk portion 74, and a swivel shaft 76. The small disk portion 72 is located below the lateral wall 42. The large disk portion 74 is located above the lateral wall 42. The swivel shaft 76 is connected to the small disk portion 72 and the large disk portion 74. The swivel shaft 76 passes through the bush 64. Thus, the swivel shaft 76 is rotatably supported by the support base portion 44. As will be described later, when the small disk portion 72 rotates, the swivel shaft 76 and the large disk portion 74 rotate integrally with the small disk portion 72.

A second rod 78 of the second cylinder 60 extends perpendicular to the sheet of FIG. 3. That is, the second rod 78 extends along a direction from the second lateral surface 16 toward the first lateral surface 14 of the flat wire 10. The direction from the second lateral surface 16 toward the first lateral surface 14 is an advancing direction of the second rod 78. The direction from the first lateral surface 14 toward the second lateral surface 16 is a retracting direction of the second rod 78. That is, the second rod 78 advances or retracts along the width direction of the flat wire 10.

Figure 4A:
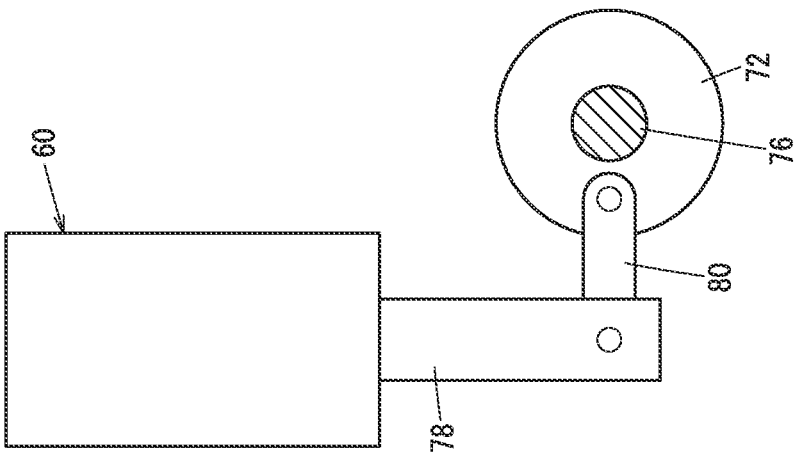
FIGS. 4A and 4B are schematic plan views of a second cylinder shown in FIG. 3.
Figure 4B:
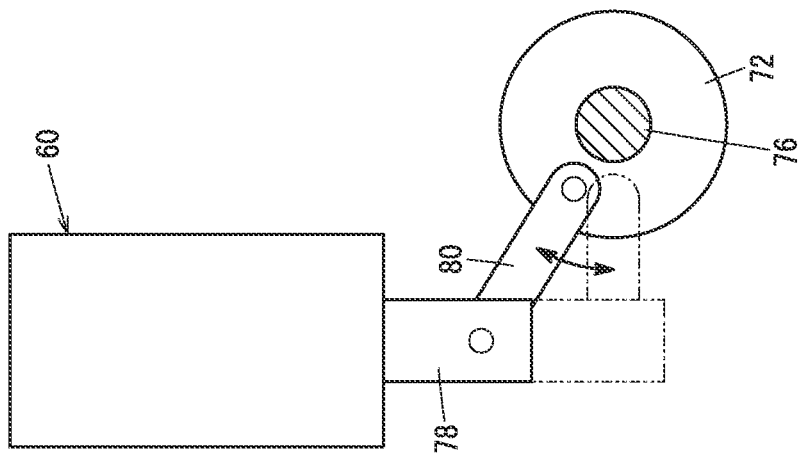

As shown in FIGS. 4A and 4B, one end of a link member 80 is connected to a distal end of the second rod 78. The other end of the link member 80 is connected to the peripheral edge portion of the small disk portion 72 which is a part of the support base portion 44. Therefore, when the second rod 78 advances toward the end of the advancing movement, the small disk portion 72 rotates counterclockwise by a predetermined angle from the viewpoint of FIG. 4A. On the other hand, when the second rod 78 retracts toward the end of retracting movement, the small disk portion 72 rotates clockwise by a predetermined angle from the viewpoint of FIG. 4A. The rotation center of the small disk portion 72 is the swivel shaft 76. As described above, the swivel shaft 76 and the large disk portion 74 shown in FIG. 3 rotate integrally with the rotation of the small disk portion 72. The rotation angle of the large disk portion 74 corresponds to a stroke amount of the second rod 78.

The upper surface of the large disk portion 74 supports the oil tank 34 (see FIG. 3). The oil tank 34 is attached to the large disk portion 74 via an unillustrated attachment means (for example, a clamp or the like). The oil tank 34 is thereby positioned and fixed. The oil tank 34 is a hollow body having a substantially rectangular parallelepiped shape. The oil tank 34 has a bottom plate portion 82 and a top plate portion 84. The bottom plate portion 82 is placed on the upper surface of the large disk portion 74. The top plate portion 84 is spaced apart from the bottom plate portion 82 at a predetermined distance.

A columnar member 88 and a spring support plate 90 are attached to the top plate portion 84 via a connecting bolt or the like (not shown). The lower surfaces of the columnar member 88 and the spring support plate 90 are spaced apart from the bottom plate portion 82.

Figure 5:
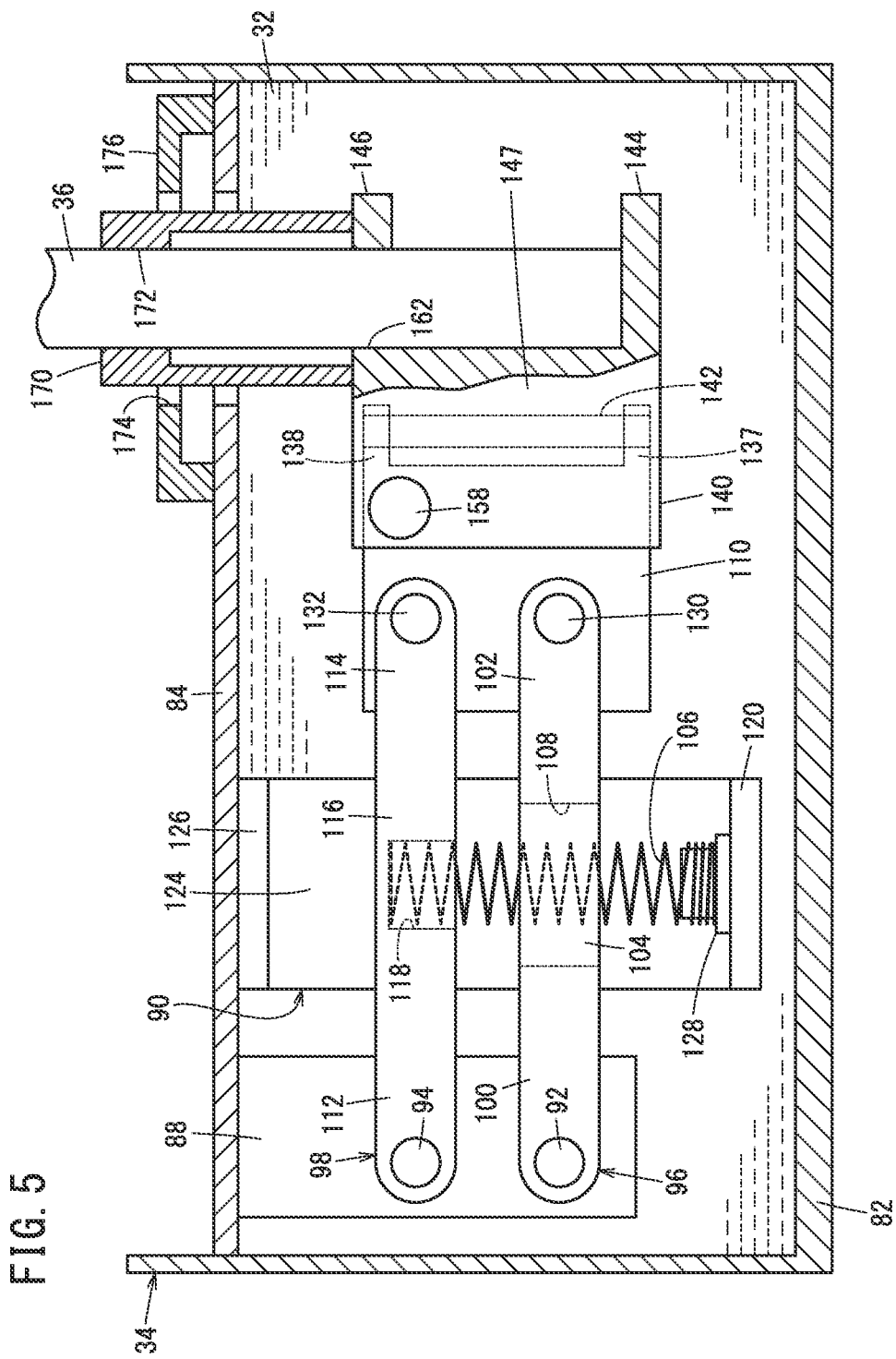
FIG. 5 is an enlarged view of a main part of FIG. 3.

The columnar member 88 has a substantially rectangular parallelepiped shape. The longitudinal direction of the columnar member 88 is the vertical direction. A front lower attachment hole and a front upper attachment hole (both not shown) are formed in the columnar member 88. The front lower mounting hole and the front upper mounting hole are arranged vertically and extend in the width direction of the flat wire 10. As shown in FIG. 5 which is an enlarged view of a main part of FIG. 3, a front lower connecting shaft 92 is inserted into the front lower mounting hole. A front upper connecting shaft 94 is inserted into the front upper mounting hole. The front lower connecting shaft 92 connects the front end of a lower bridge member 96 to the columnar member 88. The front upper connecting shaft 94 connects the front end of an upper bridge member 98 to the columnar member 88.

Figure 6:
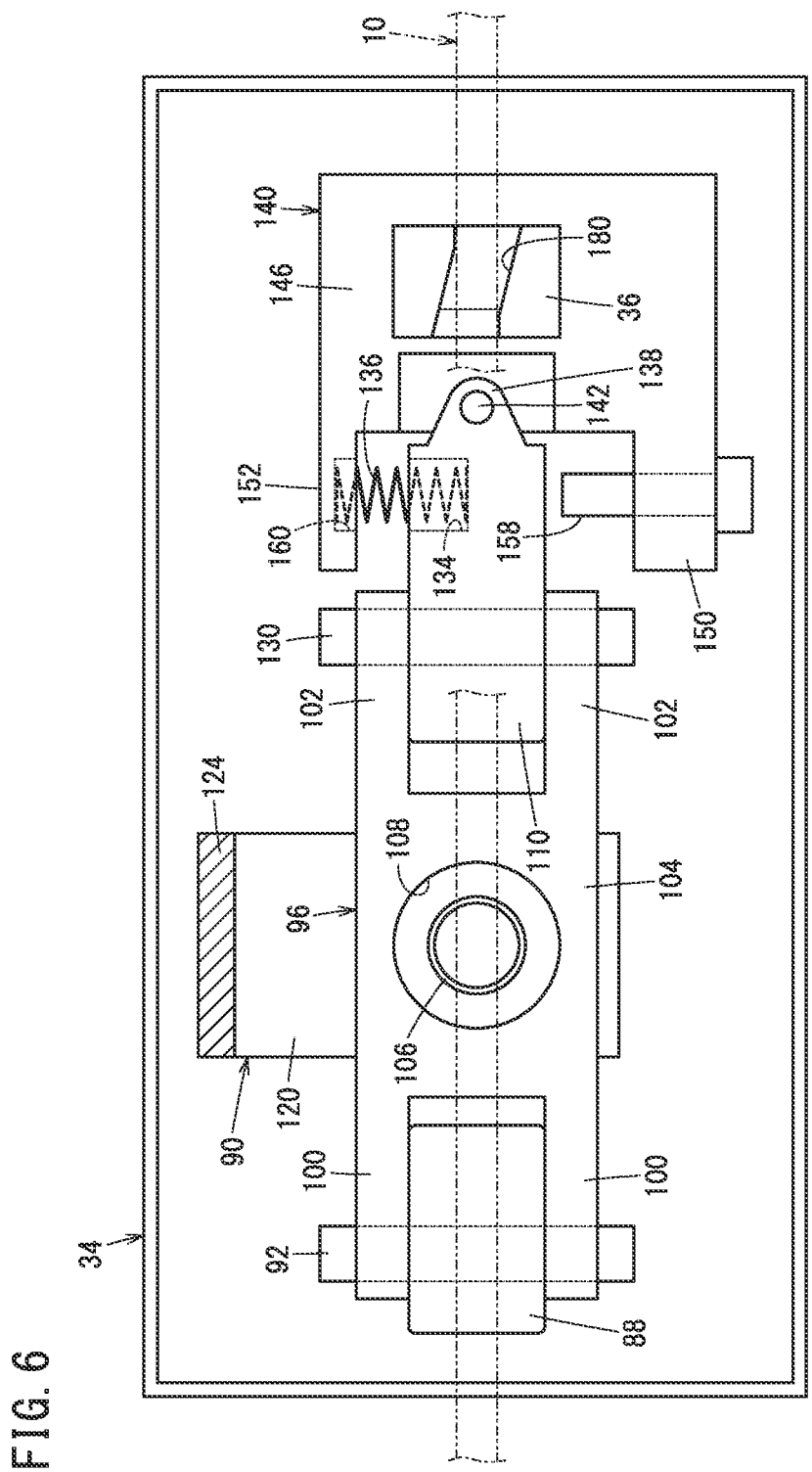
FIG. 6 is an upper plan view of the oil application device, in which a top plate portion and the like of an oil tank are omitted.

FIG. 6 is an upper plan view in which the top plate portion 84, the upper bridge member 98, and the like of the oil tank 34 are omitted. As shown in FIG. 6, the lower bridge member 96 has two narrow front lower leg portions 100 and two narrow rear lower leg portions 102. A long lower wide portion 104 is interposed between the two front lower leg portions 100 and the two rear lower leg portions 102. Therefore, the lower bridge member 96 is substantially H-shaped. Front lower through holes (not shown) are respectively formed in the two front lower leg portions 100. The columnar member 88 is inserted between the two front lower leg portions 100. At this time, the positions of the front lower through holes and the position of the front lower attachment hole are aligned with each other. The front lower connecting shaft 92 is rotatably inserted into the front lower through holes and the front lower mounting hole.

A passage hole 108 is formed in the lower wide portion 104 and penetrates in the thickness direction of the lower wide portion 104. A vertical spring 106 described later is passed through the passage hole 108. Rear lower through holes (not shown) are respectively formed in the two rear lower leg portions 102. A spring holder 110 is sandwiched between the two rear lower leg portions 102. The spring holder 110 will be described later in detail.

The upper bridge member 98 is configured in substantially the same manner as the lower bridge member 96. That is, as shown in FIG. 5, the upper bridge member 98 has two front upper leg portions 112, two rear upper leg portions 114, and an upper wide portion 116. The upper wide portion 116 is interposed between the two front upper leg portions 112 and the two rear upper leg portions 114. Therefore, the upper bridge member 98 is substantially H-shaped. Front upper through holes (not shown) are respectively formed in the two front upper leg portions 112. Rear upper through holes (not shown) are respectively formed in the two rear upper leg portions 114. The columnar member 88 is inserted between the two front upper leg portions 112. At this time, the front upper through holes and the front upper mounting hole are aligned with each other. The front upper connecting shaft 94 is rotatably inserted into the front upper through holes and the front upper mounting hole.

A first spring receiving hole 118 is formed in the lower surface of the upper wide portion 116. The first spring receiving hole 118 is recessed toward the upper surface of the upper wide portion 116. The upper end of the vertical spring 106 is inserted into the first spring receiving hole 118. The two rear upper leg portions 114 sandwich the spring holder 110.

The spring support plate 90 has a lower horizontal wall portion 120, a vertical wall portion 124, and an upper horizontal wall portion 126. The lower horizontal wall portion 120 and the vertical wall portion 124 form a portion bent at a substantially right angle. The vertical wall portion 124 and the upper horizontal wall portion 126 form a portion bent at a substantially right angle. Therefore, the spring support plate 90 is substantially U-shaped. An annular projection 128 is formed on the lower horizontal wall portion 120 and projects toward the upper horizontal wall portion 126.

The lower end of the vertical spring 106 is inserted into the annular projection 128. The lower end surface of the vertical spring 106 is seated on the bottom surface of the annular projection 128. The vertical spring 106 is passed through the passage hole 108 formed in the lower wide portion 104 of the lower bridge member 96. The upper end of the vertical spring 106 is inserted into the first spring receiving hole 118 formed in the upper wide portion 116 of the upper bridge member 98. The upper end surface of the vertical spring 106 is seated on the ceiling surface of the first spring receiving hole 118. Since the spring support plate 90 is positioned and fixed to the top plate portion 84 of the oil tank 34, the vertical spring 106 elastically biases the upper bridge member 98 upward. Due to this elastic biasing, a force is applied to the upper bridge member 98 so as to rotate the upper bridge member 98 upward with the front upper connecting shaft 94 as a rotation fulcrum.

As described above, the vertical spring 106 is an elastic member that elastically biases the upper bridge member 98 in a direction in which the upper bridge member 98 rotates upward. The vertical spring 106 constitutes the lifting mechanism together with the first cylinder 46.

As described above, the two rear lower leg portions 102 of the lower bridge member 96 and the two rear upper leg portions 114 of the upper bridge member 98 sandwich the spring holder 110. The spring holder 110 has a rear lower mounting hole and a rear upper mounting hole (both not shown). The rear lower mounting hole and the rear upper mounting hole are arranged vertically and extend in the width direction of the flat wire 10. The position of the rear lower attachment hole is aligned with the positions of the rear lower through holes. The position of the rear upper rear mounting hole is aligned with the positions of the rear upper through holes. A rear lower connecting shaft 130 is rotatably inserted into the rear lower mounting hole and the rear lower through holes. A rear upper connecting shaft 132 is rotatably inserted into the rear upper rear mounting hole and the rear upper through holes. Thus, the spring holder 110 is held at the rear ends of the lower bridge member 96 and the upper bridge member 98.

Figure 7:
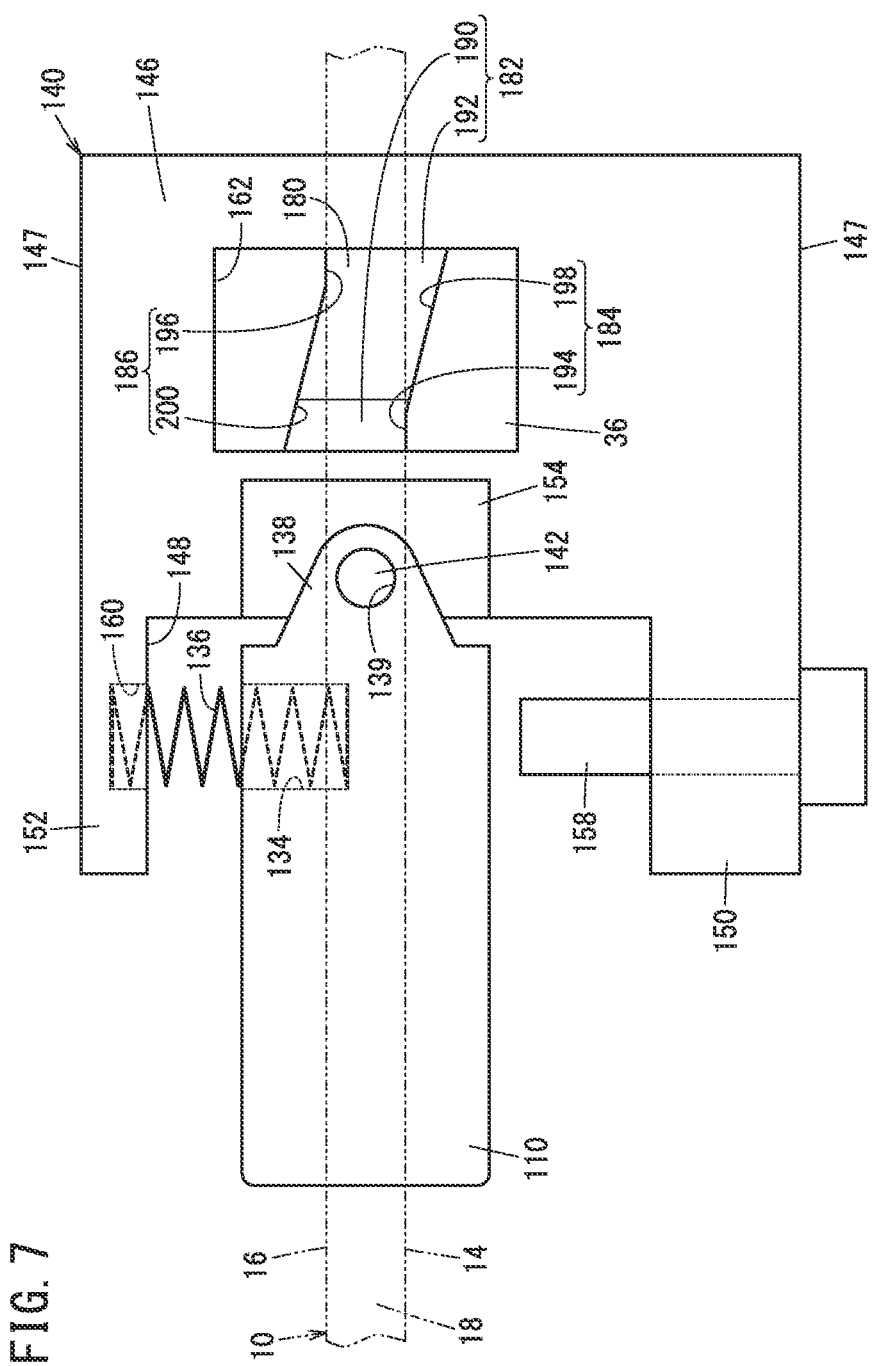
FIG. 7 is an enlarged view of a main part of FIG. 6.

FIG. 7 is an enlarged view of a main part of FIG. 6. As shown in FIG. 7, a holding hole 134 is formed in the spring holder 110. The holding hole 134 extends in the width direction from the second lateral surface 16 toward the first lateral surface 14 of the flat wire 10. One end of a lateral spring 136 is inserted into the holding hole 134. The lateral spring 136 is held by the spring holder 110 through this insertion. The other end of the lateral spring 136 is exposed from the holding hole 134. The holding hole 134 is located rearward of the rear lower mounting hole and the rear upper mounting hole.

The spring holder 110 has a lower tongue portion 137 and an upper tongue portion 138 (see FIG. 5). The lower tongue portion 137 and the upper tongue portion 138 have a semi-cylindrical shape, and are provided at the rear end of the spring holder 110. A pin insertion hole 139 (see FIG. 7) is formed in each of the lower tongue portion 137 and the upper tongue portion 138. The pin insertion hole 139 extends in the vertical direction. A connecting pin 142 is inserted through the pin insertion hole 139. The connecting pin 142 connects the spring holder 110 and a movable block 140.

The movable block 140 includes a lower plate 144, an upper plate 146, and side plates 147 (see FIG. 5). The side plates 147 are connected to the lower plate 144 and the upper plate 146. Inlet/outlet portions (not shown) are respectively formed at the front end and the rear end of the movable block 140. Each of the inlet/outlet portions is formed by cutting out a part of the side plate 147. Substantially-middle portions of the lower plate 144 and the upper plate 146 in the width direction are cut out so as to be recessed rearward (see FIG. 7). Thus, a recessed portion 148, a first protruding end portion 150, and a second protruding end portion 152 are formed in the movable block 140. The rear end of the spring holder 110 can enter the recessed portion 148. The first protruding end portion 150 and the second protruding end portion 152 project forward relative to the recessed portion 148. In other words, the first protruding end portion 150 and the second protruding end portion 152 face the rear end of the spring holder 110.

In the recessed portion 148, a lower step portion (not shown) and an upper step portion 154 are formed at the most rearward cut-out portions. The lower step portion and the upper step portion 154 are close to each other. Pin insertion holes (not shown) are formed in the lower step portion and the upper step portion 154, respectively. The upper surface of the lower tongue portion 137 contacts the ceiling surface of the lower stage portion. The lower surface of the upper tongue portion 138 contacts the bottom surface of the upper step portion 154. Further, a pin insertion hole of the movable block 140 and the pin insertion hole 139 of the spring holder 110 overlap each other. The connecting pin 142 is inserted through the pin insertion hole of the movable block 140 and the pin insertion hole 139 of the spring holder 110. Thus, the movable block 140 is supported by the spring holder 110 so as to be swingable (or rotatable) about the connecting pin 142.

The first protruding end portion 150 is provided with a stopper member 158 made up from, for example, a pin or a bolt. The stopper member 158 is passed through a stopper insertion hole formed in the first protruding end portion 150. The stopper member 158 then extends from the first lateral surface 14 toward the second lateral surface 16 of the flat wire 10. A distal end surface of the stopper member 158 is directed in the same direction as the second lateral surface 16. Also, the distal end surface of the stopper member 158 faces an end surface of the spring holder 110 that is directed in the same direction as the first lateral surface 14 of the flat wire 10. When the axis of the movable block 140 is parallel to the extending direction of the flat wire 10, the distal end surface of the stopper member 158 is separated from the side surface of the spring holder 110.

On the other hand, a second spring receiving hole 160 is formed in the second protruding end portion 152. The other end of the lateral spring 136 enters the second spring receiving hole 160. When the axis of the movable block 140 is parallel to the extending direction of the flat wire 10, the lateral spring 136 is in a compressed state in which it is pressed toward the spring holder 110 by the second projecting end portion 152. Therefore, the lateral spring 136 elastically biases the second protruding end portion 152 in a direction away from the flat wire 10. A pressing force is applied to the second protruding end portion 152. Therefore, the movable block 140 tends to swing (rotate) clockwise in FIG. 7. The swing center is the connecting pin 142. As described above, the lateral spring 136 is an elastic member constituting a rotation mechanism together with the second cylinder 60.

The oil supply member 36 is placed on the lower plate 144 (see FIG. 5). A support hole 162 is formed in the upper plate 146 for passing the oil supply member 36 therethrough. The oil supply member 36 is supported by the inner wall of the support hole 162, so that the oil supply member 36 maintains the standing posture. Since the inlet/outlet portions are formed at the front end and the rear end of the movable block 140, the oil 32 in the oil tank 34 flows into the hollow interior of the movable block 140. Thereafter, the oil 32 comes into contact with the lower end of the oil supply member 36.

A first cover 170 is provided on the upper surface of the upper plate 146 (see FIG. 3). The first cover 170 surrounds an intermediate portion of the oil supply member 36. The inner wall of the first cover 170 and the oil supply member 36 are separated from each other at a predetermined distance. A first insertion hole 172 is formed in the ceiling wall of the first cover 170. An upper end of the oil supply member 36 is exposed and extends from the first insertion hole 172. The shape and size of the first insertion hole 172 substantially correspond to the circumferential shape and size of the oil supply member 36. Therefore, the outer edge of the oil supply member 36 abuts against the inner wall of the first insertion hole 172. This abutment also helps the oil supply member 36 to be supported.

On the other hand, a second cover 176 is positioned and fixed to the upper surface of the top plate portion 84 of the oil tank 34. A second insertion hole 174 is formed in the second cover 176. The upper end of the first cover 170 and the upper end of the oil supply member 36 are exposed from the second insertion hole 174.

Figure 2:
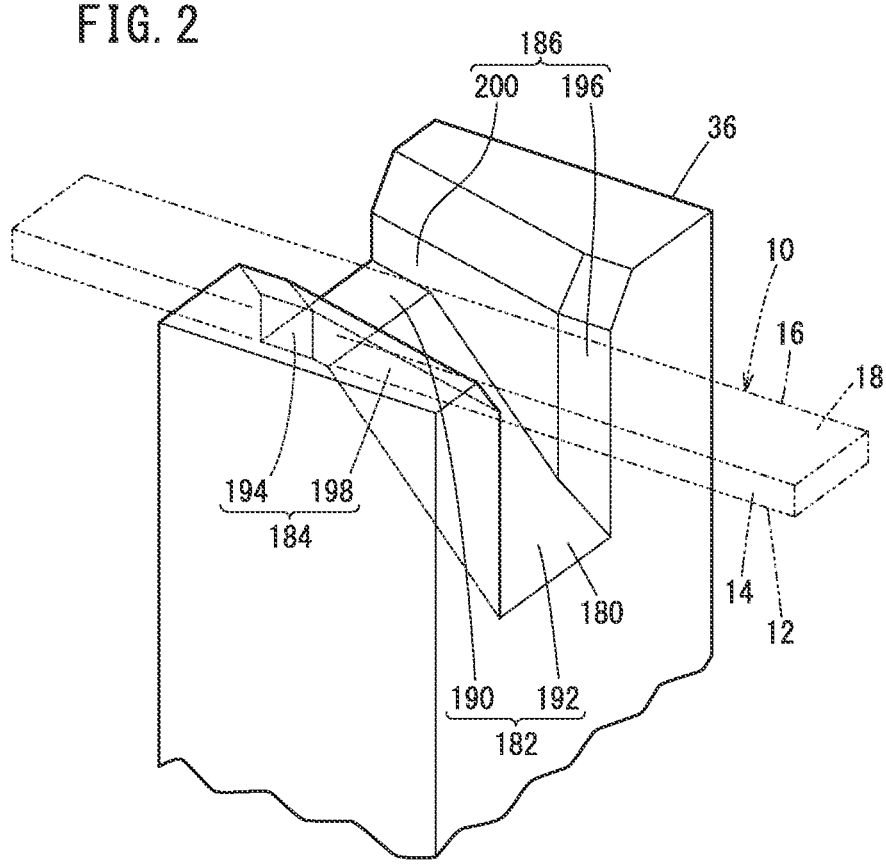
FIG. 2 is a schematic perspective view of a main part showing an oil supply member constituting the oil application device and the flat wire of FIG. 1.
Figure 8:
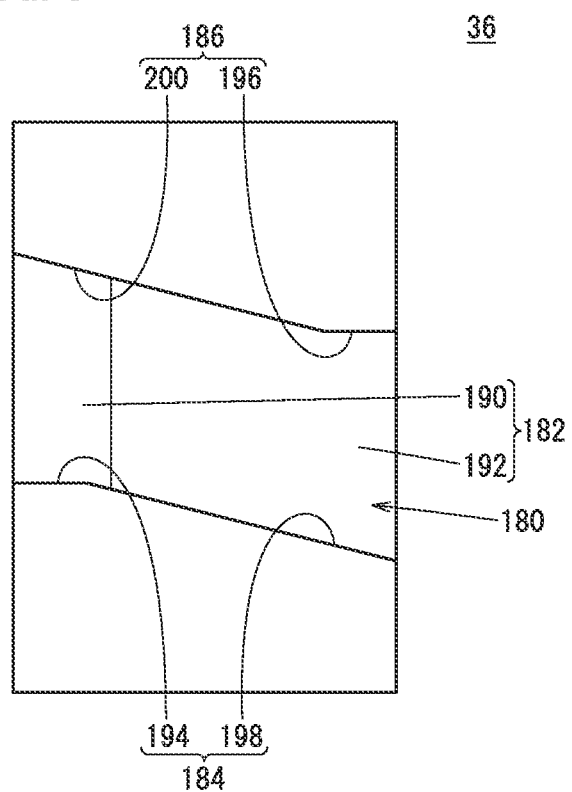
FIG. 8 is a plan view of a main part of the oil supply member.

As shown in FIGS. 1, 2 and 8, a recessed groove 180 is formed at the upper end of the oil supply member 36. The flat wire 10 is passed through the recessed groove 180. Inner surfaces of the recessed groove 180 are a bottom surface 182, a first side surface 184, and a second side surface 186. The bottom surface 182 faces the lower surface 12 of the flat wire 10. The first side surface 184 faces the first lateral surface 14. The second side surface 186 faces the second lateral surface 16. The first side surface 184 and the second side surface 186 rise substantially perpendicularly from the bottom surface 182.

The bottom surface 182 includes a lower-surface application surface 190 and an inclined portion 192. The lower-surface application surface 190 is positioned at the front end which is downstream in the advancing direction of the flat wire 10. The inclined portion 192 continues to the upstream side (rear end) of the lower-surface application surface 190. The lower-surface application surface 190 is formed as a flat surface. The lower-surface application surface 190 may have a gentle slope that is directed downward as it approaches the rear end. When the lower surface 12 of the flat wire 10 comes into sliding contact with the lower-surface application surface 190, the oil 32 is applied to the lower surface 12. The inclined portion 192 has a steep slope that is directed downward as it approaches the rear end. As can be seen in particular from FIG. 2, the inclined portion 192 is spaced apart from the lower surface 12. Therefore, the oil 32 is supplied to the lower surface 12 mainly from the lower-surface application surface 190.

The first side surface 184 has a shape such that a part of the rear end is chamfered. Therefore, the first side surface 184 is approximated to a slightly distorted V-shape. Therefore, when the axis line of the movable block 140 is parallel to the extending direction of the flat wire 10, the first side surface 184 extends in the extending direction of the flat wire 10 on the downstream side (front end) in the advancing direction of the flat wire 10, and abuts on the first lateral surface 14 of the flat wire 10. On the other hand, on the upstream side (rear end) in the advancing direction, the first side surface 184 is inclined in a direction away from the first lateral surface 14. Therefore, at the rear end, the first side surface 184 does not contact the first lateral surface 14.

The second side surface 186 is rotationally symmetric with the first side surface 184. That is, the second side surface 186 has a shape such that a part of the front end is chamfered. Therefore, in the above-described state, the second side surface 186 is inclined in a direction away from the second lateral surface 16 on the downstream side (front end) in the advancing direction of the flat wire 10. That is, at the front end, the second side surface 186 does not contact the second lateral surface 16. On the other hand, on the upstream side (rear end) in the advancing direction, the second side surface 186 extends along the extending direction of the flat wire 10 and abuts against the second lateral surface 16.

The oil 32 is supplied to the first lateral surface 14 from a portion with which the first side surface 184 comes into contact. The contact portion of the first lateral surface 14 with the first side surface 184 is a first application surface 194 that applies the oil 32 to the first side surface 184. In the first side surface 184, a portion other than the first application surface 194 is a first non-application surface 198. The oil 32 is supplied to the second lateral surface 16 from a portion with which the second side surface 186 comes into contact. A contact portion of the second lateral surface 16 with the second side surface 186 is a second application surface 196 that applies the oil 32 to the second side surface 186. In the second side surface 186, a portion other than the second application surface 196 is a second non-application surface 200.

The rear end of the recessed groove 180 is an inlet of the flat wire 10. At the rear end of the recessed groove 180, the first non-application surface 198 and the second application surface 196 face each other. The front end of the recessed groove 180 is an outlet of the flat wire 10. At the front end of the recessed groove 180, the first application surface 194 and the second non-application surface 200 face each other. Therefore, at the inlet and the outlet of the flat wire 10, the separation distance between the first side surface 184 and the second side surface 186 is larger than the width of the flat wire 10. In other words, at the inlet and the outlet of the flat wire 10, the first side surface 184 and the second side surface 186 are separated by a distance larger than the separation distance between the first lateral surface 14 and the second lateral surface 16.

In the present embodiment, the oil supply member 36 configured as described above is made of a porous body. Therefore, the oil 32 stored in the oil tank 34 is drawn up by capillary action of the oil supply member 36. The oil 32 reaches the upper end of the oil supply member 36 where the recessed groove 180 is formed.

The oil application device 30 according to the present embodiment is basically constructed in the manner described above. Next, the operation and advantageous effects of the oil application device 30 will be described.

The oil application device 30 is disposed between the bobbin 20 (see FIG. 3) and a cutting device (not shown). The cutting device is a device for cutting the flat wire 10 at a predetermined length. Before the flat wire 10 is passed through the recessed groove 180, the first rod 48 of the first cylinder 46 is retracted (lowered).

At this time, the load from the flat wire 10 does not act on the oil supply member 36. Therefore, the vertical spring 106 is in a stretched state. Here, while the vertical spring 106 is stretched, a pressing force is applied to the upper wide portion 116 of the upper bridge member 98 in a direction to raise the upper wide portion 116. As described above, the front upper leg portions 112 of the upper bridge member 98 are connected to the columnar member 88. The columnar member 88 is positioned and fixed to the top plate portion 84 of the oil tank 34. On the other hand, the rear upper leg portions 114 of the upper bridge member 98 are connected to the spring holder 110. The spring holder 110 is not restrained by the oil tank 34. Therefore, when the upper wide portion 116 is pressed as described above, the upper bridge member 98 pivots about the front upper connecting shaft 94 such that the rear upper leg portions 114 move upward.

Figure 10:
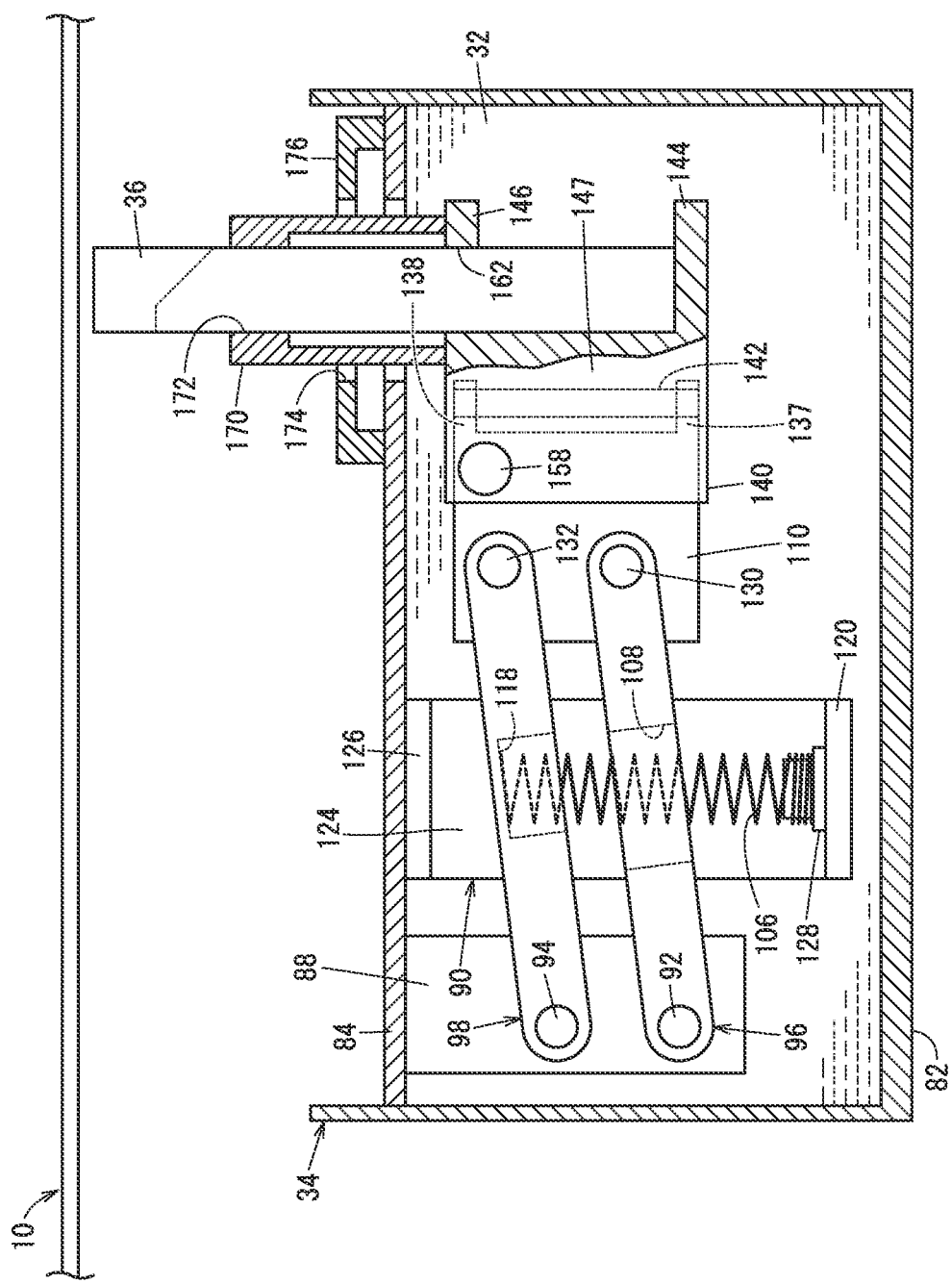
FIG. 10 is a schematic side sectional view showing a state in which the oil supply member is raised from a state shown in FIG. 3.

As a result, the spring holder 110, the movable block 140, and the oil supply member 36 rise integrally. Further, the lower bridge member 96 coupled to the spring holder 110 rotates upward about the front lower connecting shaft 92. Thus, the state shown in FIG. 10 is brought about. In this way, the vertical spring 106 elastically biases the oil supply member 36 in the upward direction (the direction toward the lower surface 12 of the flat wire 10). It should be noted that the front lower connecting shaft 92, the front upper connecting shaft 94, the rear lower connecting shaft 130, and the rear upper connecting shaft 132 rotate during the rotation and the upward movement described above.

Figure 9:
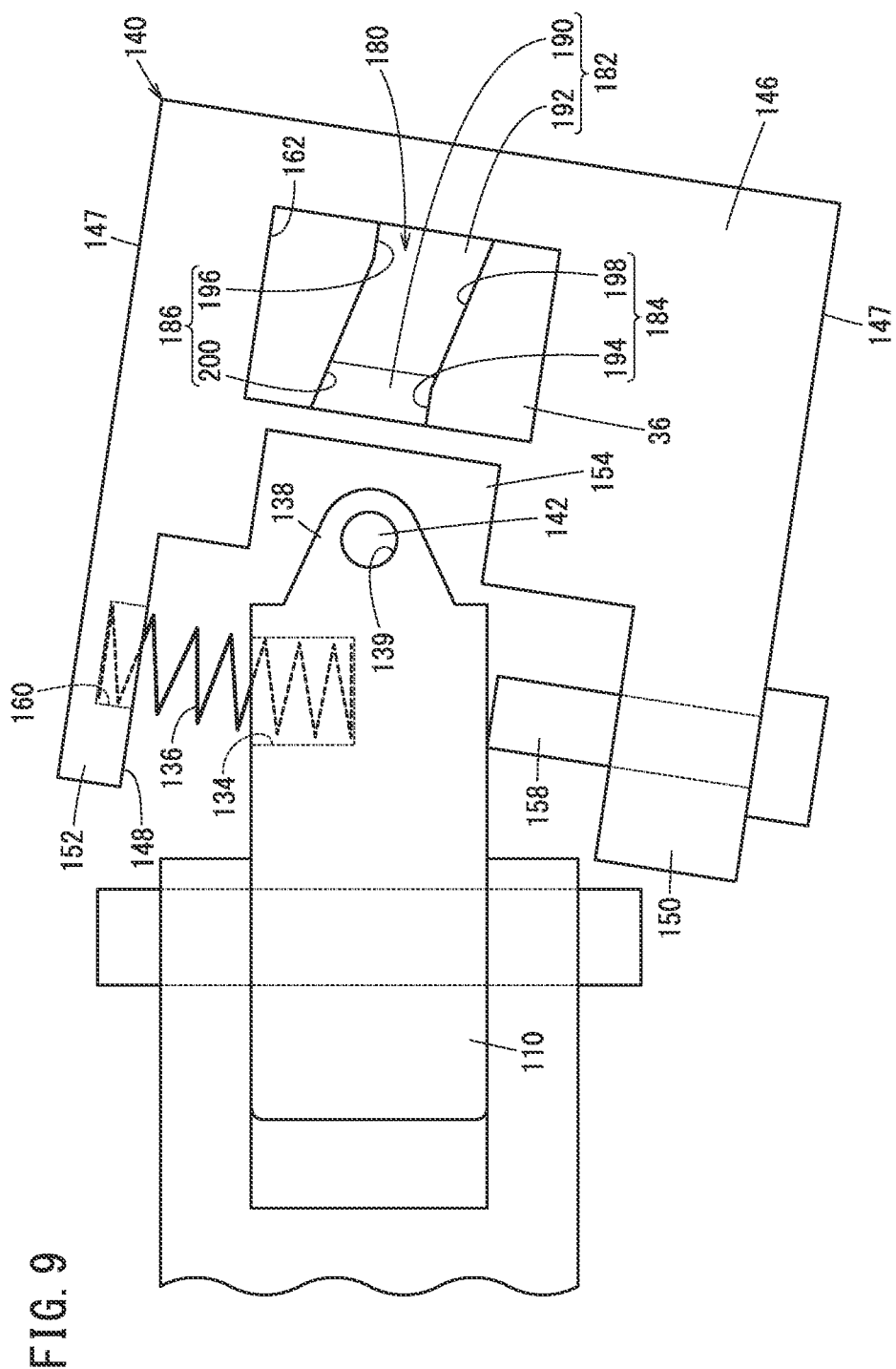
FIG. 9 is a schematic plan view of a main part showing a state in which a movable block is elastically biased by a lateral spring from a state shown in FIG. 7.

As shown in FIG. 9, a pressing force is applied from the lateral spring 136 to the second protruding end portion 152 of the movable block 140. Accordingly, the movable block 140 swings so that the rear end of the movable block 140 rotates in the clockwise direction in FIG. 9. When the distal end surface of the stopper member 158 comes into contact with the side surface of the spring holder 110, the swing of the movable block 140 is stopped.

In this state, the second cylinder 60 is driven to advance the second rod 78. As a result, the oil tank 34 rotates counterclockwise in FIG. 9. As a result, the axis of the oil tank 34 is inclined with respect to the advancing direction (extending direction) of the flat wire 10. The movable block 140 also rotates in the same direction (counterclockwise in FIG. 9) integrally with the oil tank 34. As a result, the axis of the movable block 140 becomes parallel to the advancing direction (extending direction) of the flat wire 10.

Next, the front end of the flat wire 10 is pulled out from the bobbin 20 and is wound around a pulley or the like (not shown). As a result, a predetermined tension is applied to the flat wire 10. As a result, the flat wire 10 is tensioned. A part of the flat wire 10 is positioned above the recessed groove 180.

Next, the first rod 48 of the first cylinder 46 advances (rises). As a result, the oil tank 34, the respective members in the oil tank 34, and the oil supply member 36 rise integrally. The cylinder tube 56 of the first cylinder 46 is guided by the guide body 52 of the guide part 50.

When the oil supply member 36 rises with the rise of the first rod 48, the flat wire 10 enters the recessed groove 180 from the upper opening of the recessed groove 180. The extending direction of the flat wire 10 is parallel to the axis of the movable block 140. Therefore, by passing the flat wire 10 through the recessed groove 180, the first application surface 194 of the first side surface 184 comes into contact with the first lateral surface 14. In addition, the second application surface 196 of the second side surface 186 is in contact with the second lateral surface 16. On the other hand, the first non-application surface 198 of the first side surface 184 is spaced apart from the first lateral surface 14. Similarly, the second non-application surface 200 of the second side surface 186 is spaced apart from the second lateral surface 16. Further, the lower-surface application surface 190 comes into contact with the lower surface 12 of the flat wire 10. In addition, the inclined portion 192 is spaced away from the lower surface 12.

When the first rod 48 and the oil supply member 36 further rise, the lower-surface application surface 190 of the recessed groove 180 receives a pressing force from the lower surface 12. The direction of action of this pressing force is downward. That is, the flat wire 10 presses the oil supply member 36 downward. Accordingly, the oil supply member 36 presses the lower plate 144 of the movable block 140 downward.

As described above, the spring holder 110 is connected to the movable block 140. The spring holder 110 is connected to the columnar member 88 via the lower bridge member 96 and the upper bridge member 98. The spring holder 110 is not restrained by the oil tank 34. On the other hand, the columnar member 88 is positioned and fixed to the top plate portion 84 of the oil tank 34. Therefore, when the oil supply member 36 presses the lower plate 144 of the movable block 140 downward, the lower bridge member 96 and the upper bridge member 98 rotate downward. The rotation centers of the lower bridge member 96 and the upper bridge member 98 are the front lower connecting shaft 92 and the front upper connecting shaft 94, respectively.

Figure 11:
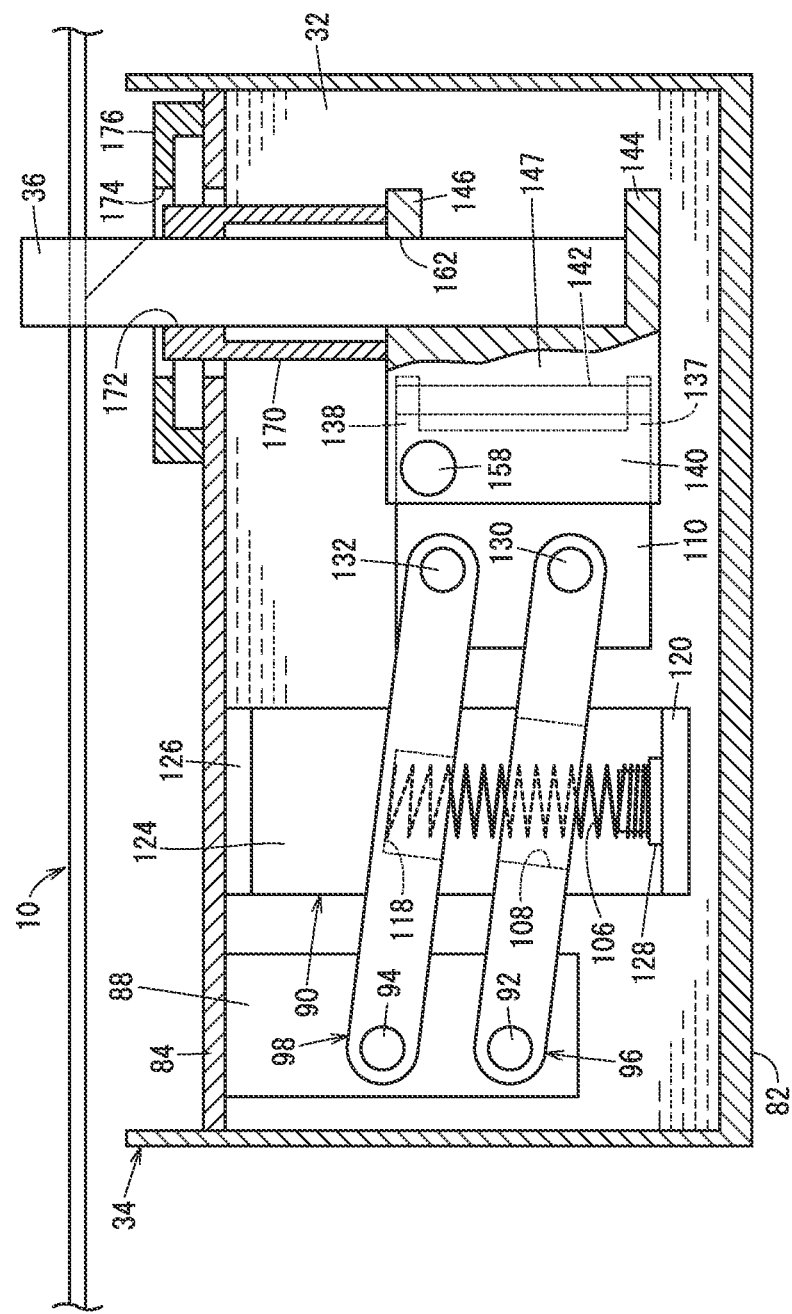
FIG. 11 is a schematic side sectional view showing a state in which the oil supply member is lowered from the state shown in FIG. 3.
Figure 12:
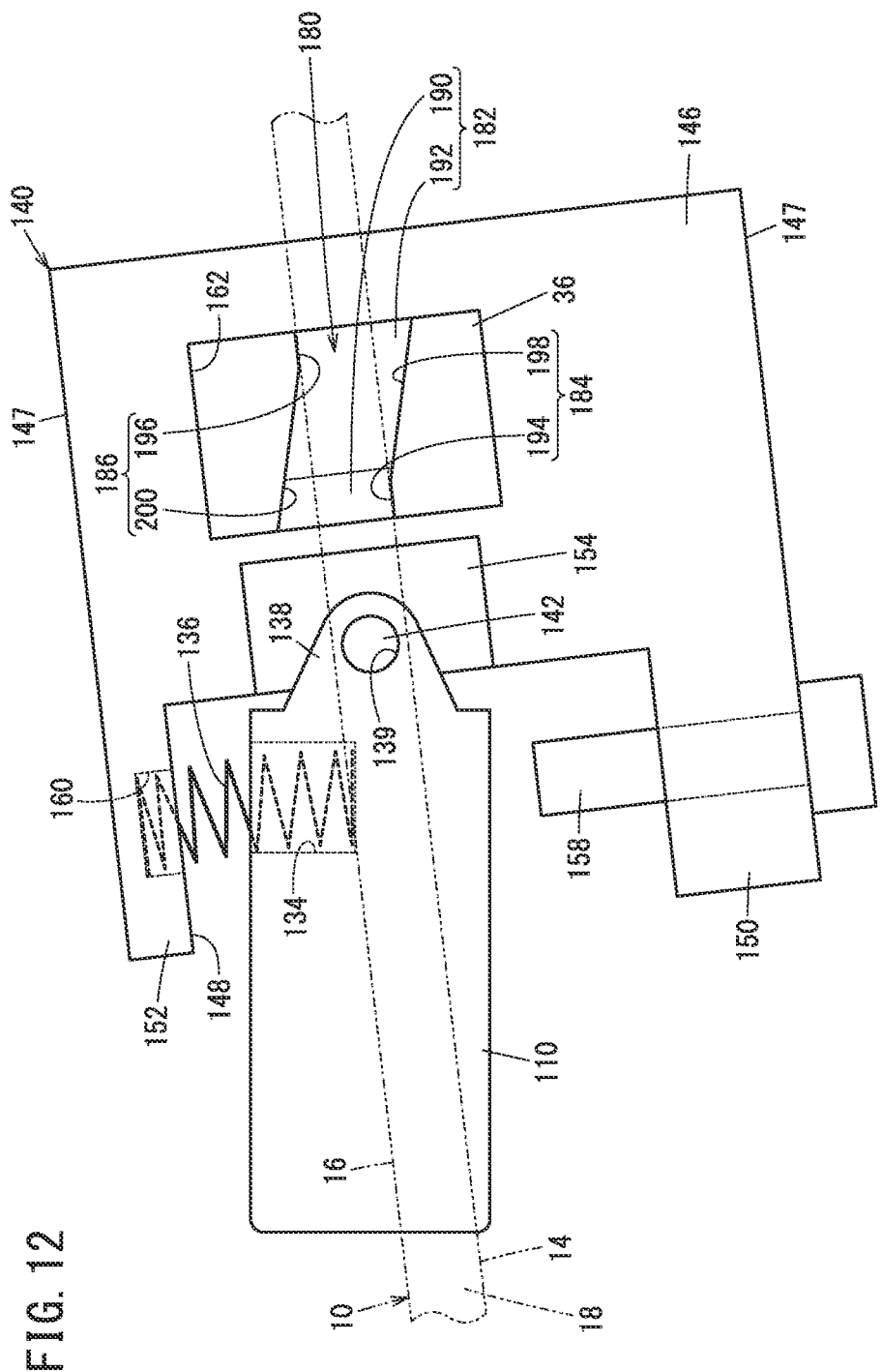
FIG. 12 is a schematic plan view of a main part showing a state in which the movable block is swung from a state shown in FIG. 7.
Figure 13:
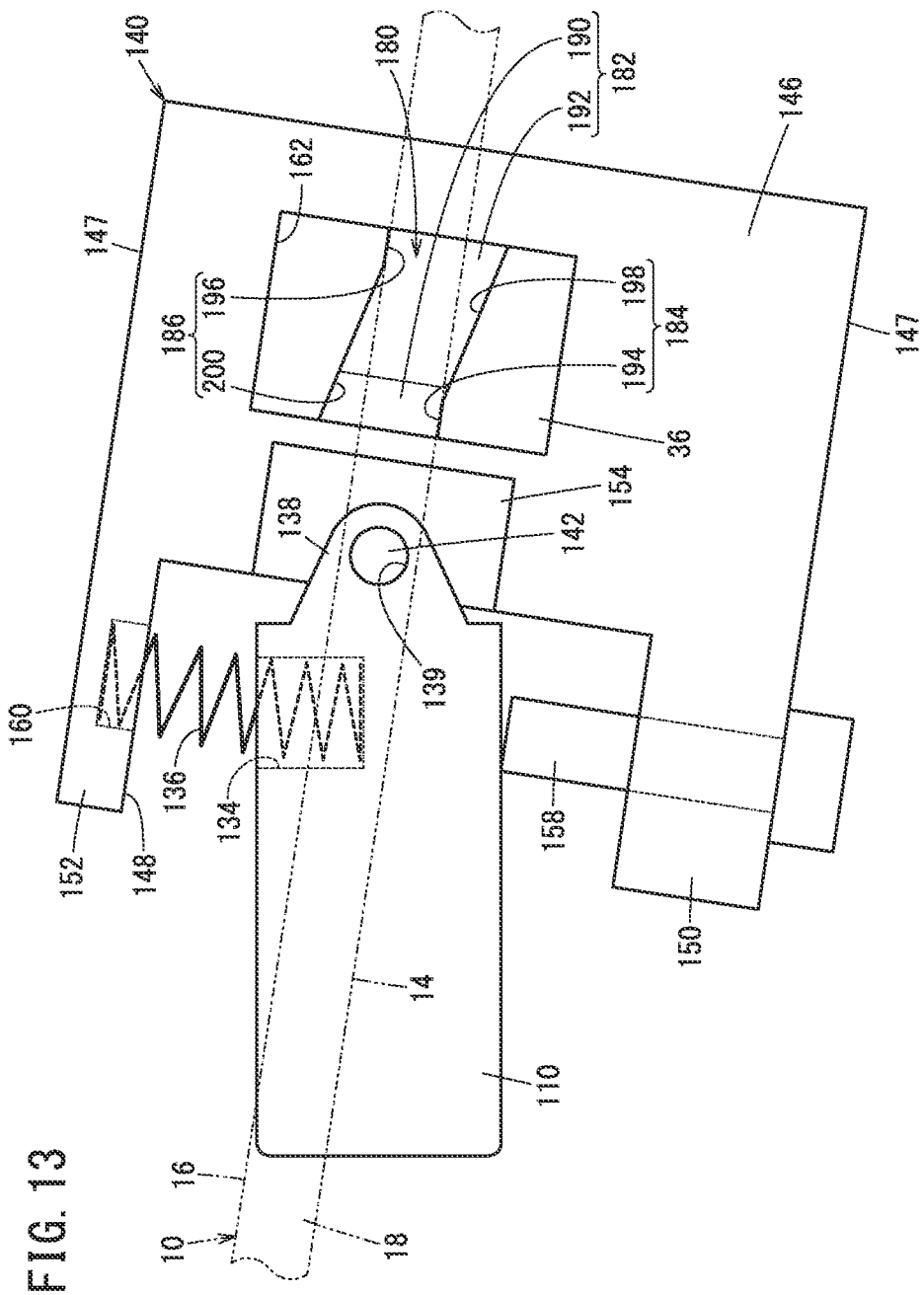
FIG. 13 is a schematic plan view of a main part showing a state in which the movable block swings in a direction opposite to that in FIG. 12.

As a result of this rotation, the movable block 140 and the spring holder 110 is lowered into the state shown in FIG. 11. The rise of the first rod 48 is stopped at this point. As the upper bridge member 98 is lowered, the vertical spring 106 is compressed. While the lower bridge member 96 and the upper bridge member 98 are lowered, the front lower connecting shaft 92, the front upper connecting shaft 94, the rear lower connecting shaft 130, and the rear upper connecting shaft 132 rotate.

Thereafter, the second rod 78 retracts. As a result, the oil tank 34 rotates clockwise in FIG. 9. As a result, the axis of the oil tank 34 becomes parallel to the extending direction of the flat wire 10. The flat wire 10 has already entered the recessed groove 180 formed in the oil supply member 36. In addition, the first lateral surface 14 is in contact with the first application surface 194, and the second lateral surface 16 is in contact with the second application surface 196. Thus, the movable block 140 is restrained by the flat wire 10. Therefore, the movable block 140 is prevented from rotating integrally with the oil tank 34, thereby maintaining the state in which the flat wire 10 enters the recessed groove 180.

As the oil tank 34 rotates, the spring holder 110 integrally rotates. Therefore, when the oil tank 34 returns to the original posture, the movable block 140 swings (rotates) relative to the spring holder 110. The center of the swing is the connecting pin 142. By this swing, the second protruding end portion 152 approaches the spring holder 110. In addition, the lateral spring 136 is compressed. Therefore, the lateral spring 136 elastically biases the second protruding end portion 152 in a direction away from the spring holder 110 (clockwise direction in FIGS. 7 and 9).

As a result, in the oil supply member 36, the first application surface 194 of the recessed groove 180 is pressed against the first lateral surface 14. In addition, the second application surface 196 is pressed against the second lateral surface 16. That is, the lateral spring 136 elastically biases the oil supply member 36. The direction of elasticity of the lateral spring 136 is a direction in which the first application surface 194 comes into contact with the first lateral surface 14 and the second application surface 196 comes into contact with the second lateral surface 16.

As described above, the oil supply member 36 is made of a porous body and has already drawn up the oil 32 in the oil tank 34 by capillary action. Therefore, the oil 32 exudes from the bottom surface 182, the first side surface 184, and the second side surface 186 of the recessed groove 180. Next, the flat wire 10 advances toward the downstream side (front side) while being sequentially pulled out by the rotation of the pulley or the like. At this time, the lower surface 12 comes into sliding contact with the lower-surface application surface 190. The first lateral surface 14 is in sliding contact with the first application surface 194. In addition, the second lateral surface 16 is in sliding contact with the second application surface 196.

During this sliding contact, the oil 32 exudes from the lower-surface application surface 190, the first application surface 194, and the second application surface 196. The exuded oil 32 is applied to each of the lower surface 12, the first lateral surface 14, and the second lateral surface 16. That is, according to the present embodiment, the oil 32 can be selectively applied to the first lateral surface 14, the second lateral surface 16, and the lower surface 12, without applying the oil 32 to the upper surface 18 of the flat wire 10.

The flat wire 10 often vibrates in the thickness direction as the tension varies. When the flat wire 10 rises from the state shown in FIG. 11 and the lower surface 12 is about to separate from the lower-surface application surface 190, the load acting on the oil supply member 36 from the flat wire 10 is reduced. When the load falls below the elastic biasing force of the vertical spring 106, the vertical spring 106 elastically biases the upper wide portion 116 of the upper bridge member 98. As a result, the spring holder 110, the movable block 140 and the oil supply member 36 rise in the same manner as described above. Therefore, the lower-surface application surface 190 is kept in contact with the lower surface 12 of the flat wire 10.

On the other hand, when the flat wire 10 lowers, the lower surface 12 presses the lower-surface application surface 190. Therefore, the load acting on the oil supply member 36 from the flat wire 10 increases. When the load exceeds the elastic biasing force of the vertical spring 106, the oil supply member 36, the movable block 140, and the spring holder 110 are integrally lowered in the same manner as described above. As a result, also in this case, the lower-surface application surface 190 is kept in contact with the lower surface 12 of the flat wire 10. The lower bridge member 96 and the upper bridge member 98 rotate about the front ends connected to the columnar member 88 such that the rear ends thereof are lowered, at the same time as the oil supply member 36, the movable block 140, and the spring holder 110 are lowered. Accordingly, the vertical spring 106 is compressed.

As described above, according to the present embodiment, even when the flat wire 10 vibrates so as to move up and down, the state can be maintained in which the lower surface 12 of the flat wire 10 is in contact with the lower-surface application surface 190 of the oil supply member 36.

That is, the oil 32 can be continuously applied to the lower surface 12 of the flat wire 10 that is sequentially pulled out forward. In other words, the oil 32 can be evenly applied to the lower surface 12. Thus, it is possible to avoid the occurrence of a non-application portion on the lower surface 12.

When the flat wire 10 vibrates in the width direction, the movable block 140 swings about the connecting pin 142. For example, a case will be described where the flat wire 10 vibrates such that the front end thereof moves toward the first lateral surface 14 and the rear end thereof moves toward the second lateral surface 16. In this case, the movable block 140 follows this vibration and swings in the direction shown in FIG. 12. As a result, the first protruding end portion 150 is separated from the spring holder 110, and the second protruding end portion 152 approaches the spring holder 110. Thus, the contact between the first application surface 194 and the first lateral surface 14 and the contact between the second application surface 196 and the second lateral surface 16 are maintained. In addition, the separation between the first non-application surface 198 and the first lateral surface 14 is maintained. Also, the separation between the second non-application surface 200 and the second lateral surface 16 is maintained. When the movable block 140 swings as described above, the lateral spring 136 is compressed.

On the contrary, the case will be described where the flat wire 10 vibrates such that the front end side thereof moves toward the second lateral surface 16 side and the rear end side thereof moves toward the first lateral surface 14 side. The movable block 140 is elastically biased by the expanding lateral spring 136 and swings in the direction shown in FIG. 13. As a result, the first protruding end portion 150 approaches the spring holder 110, and the second protruding end portion 152 is separated from the spring holder 110. This swinging maintains the contact between the first application surface 194 and the first lateral surface 14. At the same time, the contact between the second application surface 196 and the second lateral surface 16 is maintained. In addition, the separation between the first non-application surface 198 and the first lateral surface 14 is maintained. Also, the separation between the second non-application surface 200 and the second lateral surface 16 is maintained.

As described above, in the present embodiment, the lateral spring 136 is provided. The lateral spring 136 allows the movable block 140 to swing with respect to the spring holder 110. As a result, the oil supply member 36 is indirectly elastically biased in a predetermined direction. The predetermined direction is a direction in which the first application surface 194 of the recessed groove 180 is pressed against the first lateral surface 14 and the second application surface 196 of the recessed groove 180 is pressed against the second lateral surface 16. Thus, when the flat wire 10 vibrates along the width direction, the movable block 140 swings following the vibration. Therefore, even when the flat wire 10 vibrates along the width direction, the first application surface 194 is kept in contact with a part of the first lateral surface 14. In addition, a state in which the second application surface 196 is in contact with a part of the second lateral surface 16, is also maintained.

Therefore, it is possible to continuously apply the oil 32 to the first lateral surface 14 and the second lateral surface 16 of the flat wire 10 that is pulled out forward sequentially. In other words, the oil 32 can be evenly applied to the first lateral surface 14 and the second lateral surface 16. As a result, it is possible to avoid occurrence of non-application portions on the first lateral surface 14 and the second lateral surface 16. As described above, in this case, the oil 32 is stably supplied to the lower surface 12, the first lateral surface 14, and the second lateral surface 16.

The center of swing of the movable block 140 is the connecting pin 142. The connecting pin 142 is spaced apart from the oil supply member 36. In this case, even when the swing amount (deflection angle) of the movable block 140 is small, the movement amount of the oil supply member 36 is larger than when the swing center is the oil supply member 36. Therefore, the oil supply member 36 swings accurately following the vibration of the flat wire 10.

Figure 14:
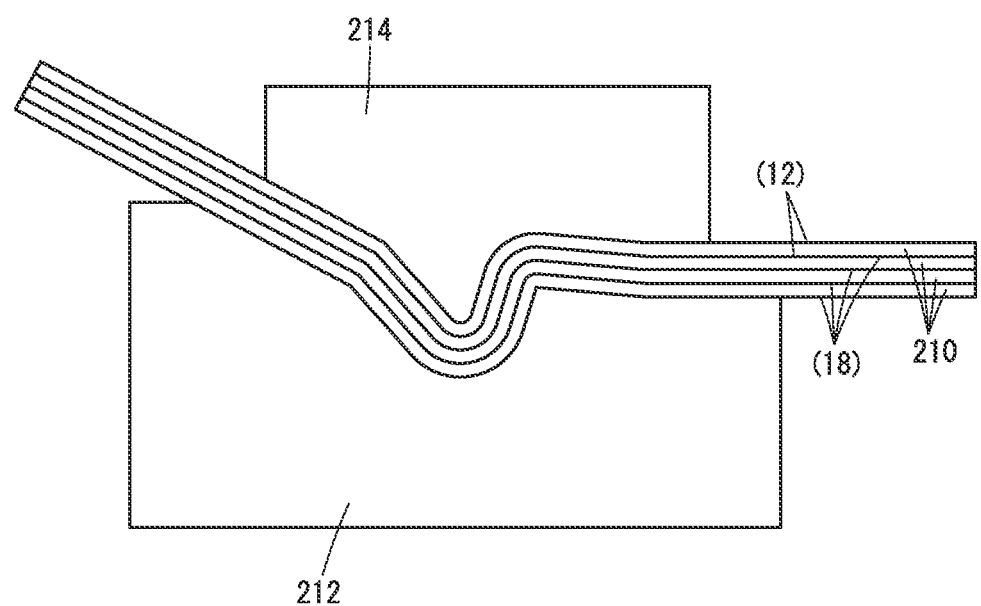
FIG. 14 is a schematic cross-sectional view of a main part showing a state in which wire members are bundled and formed.

The flat wire 10 with the oil 32 selectively applied to the lower surface 12, the first lateral surface 14, and the second lateral surface 16, is then sent to the cutting device. The cutting device cuts the flat wire 10 at a predetermined length. Thus, wire rods 210 shown in FIG. 14 are obtained. The plurality of wire rods 210 are bundled to form a wire bundle. The bundle is placed on a die 212. The bundle is then pressed by a punch 214. By this pressing, the wire bundle is bent into a substantially U-shape.

In the case where the oil 32 is applied to the surfaces of the wire rods 210 facing the die 212, when the wire bundle is pressed by the punch 214, the wire bundle may undesirably slide with respect to the die 212. That is, the wire bundle is misaligned with respect to the die 212. When such a situation occurs, even if the punch 214 advances, the bending of the wire bundle is insufficient.

In the present embodiment, the oil 32 is prevented from being applied to the upper surface 18 when the flat wire 10 passes through the recessed groove 180. Therefore, when the bending process is performed, the surface that was the upper surface 18 in the application process of the oil 32 is directed to the die 212. An upper surface 18 of another wire rod 210 is stacked on the lower surface 12 facing the punch 214.

No oil 32 has been applied to the upper surface 18 facing the die 212. Therefore, when the wire bundle is pressed by the punch 214, the wire bundle is prevented from sliding with respect to the punch 214. Similarly, it is also possible to prevent the bundled (or stacked) wire rods 210 from sliding on each other. For the reasons described above, the wire bundle can be sufficiently bent. As a result, a segment having good dimensional accuracy can be obtained. That is, by applying the oil 32 to the flat wire 10 by the oil application device 30 having the above-described configuration, the flat wire 10 can be formed into a segment with high accuracy. Therefore, the yield of segments is improved.

The legs of the segments obtained from the flat wire 10 are inserted into slots formed in the stator core. At the time of this insertion, the legs come into sliding contact with the inner wall of the slots via an insulator (for example, insulating paper) previously inserted into the slots.

Next, the segment with the legs inserted into the slot is twisted and bent. At this time, a bending force also acts on the legs. Therefore, the legs come into sliding contact with the inner wall of the slots via the insulating paper even during twisting and bending.

As described above, the oil 32 is applied to three surfaces among the four surfaces forming the legs. Since the oil 32 serves as a lubricant, the legs smoothly slide on the insulating paper. That is, the frictional resistance between the legs and the insulating paper is reduced. Therefore, the insulating paper is prevented from being damaged. Further, since the insulating paper is prevented from being displaced, the legs are prevented from coming into direct sliding contact with the inner walls of the slots. Damage to the legs or the inner walls of the slots due to this is thus avoided.

As described above, by selectively applying the oil 32 to the lower surface 12, the first lateral surface 14, and the second lateral surface 16 of the flat wire 10, it is possible to obtain the flat wire 10 that can be formed with high accuracy. Therefore, by bending the flat wire 10, a segment having excellent dimensional accuracy can be manufactured.

In this segment, oil 32 is applied to the legs. Therefore, when the segment is twisted and bent after the legs are inserted into the slots, the frictional resistance between the legs and the insulating paper which is an insulator is reduced. That is, according to the present embodiment, it is possible to obtain the flat wire 10 having a small frictional resistance to the insulator while being easily formed.

The present invention is not limited to the above-described embodiments, and various additional or modified structures can be adopted therein without deviating from the gist of the present invention.

For example, in this embodiment, the flat wire 10 has a rectangular cross section. Alternatively, the flat wire 10 may have a trapezoidal cross section.

A member other than the segment may be formed from the flat wire 10.

Further, the advancing direction of the flat wire 10 may be opposite to that in FIG. 1.

What is claimed is:

1. An oil application device that selectively applies oil to a first lateral surface and a second lateral surface of a flat wire, the flat wire including a lower surface, an upper surface that is an opposite surface of the lower surface, the first lateral surface extending from the lower surface to the upper surface, and the second lateral surface that is an opposite surface of the first lateral surface and extends from the lower surface to the upper surface, the oil application device comprising:
   an oil supply member including a first side surface and a second side surface facing the first lateral surface and the second lateral surface, respectively, the first side surface and the second side surface being separated from each other by a distance larger than a distance between the first lateral surface and the second lateral surface; and
   a rotation mechanism configured to rotate the oil supply member,
   wherein at least a part of the first side surface is a first application surface that is in contact with a part of the first lateral surface and that is configured to supply oil to the first lateral surface,
   at least a part of the second side surface is a second application surface that is in contact with a part of the second lateral surface and that is configured to supply oil to the second lateral surface, and
   the rotation mechanism rotates the oil supply member to a direction in which the first application surface comes into contact with the first lateral surface and the second application surface comes into contact with the second lateral surface.

2. The oil application device according to claim 1, wherein the first application surface is formed by chamfering a part of one end portion of the first side surface in an extending direction of the flat wire, and
   the second application surface is formed by chamfering a part of another end portion of the second side surface in a manner that the part of the another end portion of the second side surface is parallel to the first application surface.

3. The oil application device according to claim 1, wherein the rotation mechanism includes an elastic member configured to elastically bias the oil supply member in a manner that the first application surface and the second application surface come into contact with the first lateral surface and the second lateral surface, respectively.

4. The oil application device according to claim 3, wherein the rotation mechanism further includes a rotary actuator configured to rotate the oil supply member, and
   wherein the rotary actuator rotates the oil supply member in a first rotation direction in which the first application surface and the second application surface come into contact with the first lateral surface and the second lateral surface, respectively, or in a second rotation direction that is opposite to the first rotation direction.

5. The oil application device according to claim 1, wherein the oil supply member includes a recessed groove having a bottom surface that is configured to supply oil, in addition to the first side surface and the second side surface, and
   wherein the oil application device includes an lifting mechanism configured to raise and lower the oil supply member in a thickness direction of the flat wire, which is an extending direction of the first lateral surface and the second lateral surface, and
   the lifting mechanism raises the oil supply member in a manner that the lower surface of the flat wire comes into contact with an application surface of the bottom surface.

6. The oil application device according to claim 5, wherein the lifting mechanism includes an elastic member configured to elastically bias the oil supply member toward the lower surface of the flat wire.

7. The oil application device according to claim 6, wherein the lifting mechanism further includes a lifting actuator configured to raise and lower the oil supply member in a first direction in which the lower surface of the flat wire comes into contact with the application surface of the bottom surface or in a second direction opposite to the first direction.

8. The oil application device according to claim 1, wherein the oil supply member is formed of a porous body,
   at least a lower end portion of the oil supply member is immersed in an oil tank that is disposed below the oil supply member and stores oil, and
   oil is moved from the oil tank to the first side surface and the second side surface of the oil supply member by capillary action of the oil supply member.

* * * * *